Patented Jan. 4, 1949

2,458,214

UNITED STATES PATENT OFFICE 2,458,214

HYDROGENATION OF NITRO COMPOUNDS

Mott Souders, Jr., Piedmont, Calif., assignor to Shell Development Company, San Francisco, Calif., a corporation of Delaware No Drawing. Application June 26, 1944, Serial No. 542,248

16 Claims. (Cl. 260—580)

This invention relates to the production of amines, and particularly to the manufacture of aromatic amines by the catalytic hydrogenation of the corresponding aromatic nitro compounds.

It is known that various aromatic nitro compounds may be reduced to the corresponding aromatic amines. For example, it has been previously proposed to produce amines, e. g. aniline, by reducing the corresponding nitro compound by means of iron filings or powder and a dilute solution of an acid of the type of hydrochloric or acetic acids. Other reducing agents, such as metallic tin, stannic chloride, zinc, etc., with or without acids of the above-defined class, have also been proposed for the reduction of nitro compounds. All of these processes have inherent defects which render them ineffective and/or uneconomical for the commerical-scale production of aromatic amines.

It has been also proposed to reduce the aromatic nitro compounds by subjecting them in the vapor or liquid phases to the action of hydrogen in the presence of various catalysts or catalytic materials, such as nickel, iron, copper, platinum, etc., which may or may not be disposed on carriers or supports of the type of diatomaceous earths, kieselguhr, slica, pumice, asbestos, and the like. In so far as the vapor phase catalytic hydrogenation of the aromatic nitro compounds is concerned, it has been found that the ordinary catalysts employed therefor usually have a low efficiency and a relatively short catalyst life, thus rendering the process uneconomical. Also, due to the highly exothermic character of the reaction, which causes a very large evolution of heat of reaction, the vapor phase hydrogenation processes are difficult to control, at least when catalysts of the above-mentioned type are employed. This results in the effecting of the reaction at excessive temperatures which, in turn, cause the formation of excessive amounts of undesirable byproducts.

The liquid phase catalytic hydrogenation of nitro compounds, as proposed and effected until the present time, is also disadvantageous, primarily because it necessitates the use of relatively long contact periods and because the separation of the aromatic amines from the catalyst and other reaction products presents difficulties of operation. For instance, such a liquid phase process of producing aromatic amines is generally practiced in the following manner: An aromatic nitro compound, which may or may not be dissolved in a diluent such as the aromatic amine (which is the product of the hydrogenation reaction), is disposed in a reaction vessel together with a hydrogenation catalyst, such as nickel, cobalt or copper supported on a foraminous material, e.g. kieselguhr, pumice, etc. Hydrogen is then passed through the mass in the reactor at such a rate as to maintain the catalyst in suspension in the liquid which is kept at a suitable or optimum temperature and pressure. Such a treatment causes the hydrogenation of the aromatic nitro compound, this hydrogenation being continued until a desirable or optimum conversion occurs. Thereafter, the reaction mixture comprising the unreacted nitro compound, if any, and the hydrogenated reaction product or products are separated from the catalyst, e. g. by filtration, decanting, centrifuging, or the like. Such a treatment is disadvantageous since, aside from the necessity of interrupting the hydrogenation reaction, the various heretofore employed methods of separating the catalyst are economically ineffective, difficult and/or require long treatments in costly and cumbersome equipment, and, in the case where filters are used, necessitate the use of filter-aids. Even in the case of continuous operation, wherein a portion of the reaction mixture (together with the catalyst suspended therein) is continuously or periodically withdrawn from the reaction zone, or where a portion of the reaction mixture is withdrawn by filtration through a filter within the reactor, such a process, besides the aforementioned inherent defects caused by the necessity of separating the liquid from the catalyst, possesses the added disadvantage in that a part of such withdrawn liquid will be the unreacted nitro compound, so that the yield of the desired amines, per unit volume of reactor space per unit time, will be low and therefore uneconomical.

It is therefore the main object of the present process to avoid the above and other defects, and to provide an improved process for the catalytic liquid phase hydrogenation of the above-mentioned and hereinbelow more fully described class of organic nitro compounds. Another object of the invention is to provide an improved process wherein the advantages inherent in liquid phase hydrogenation of nitro compounds may be combined with certain advantages of vapor phase hydrogenation systems, whereby high yields of the desired aromatic amines may be obtained and whereby said amines may be readily and economically recovered from the reaction mixtures.

It has now been discovered that the above and other objects may be attained by subjecting organic nitro compounds, in the liquid state, to the action of hydrogen or of a hydrogen-containing gas, in the presence of a hydrogenation catalyst which is preferably suspended in said nitro compound, said hydrogenation being effected under conditions such that all or substantially all (or at least a major proportion) of the amines formed as a result of this hydrogenation are removed from the reaction zone in the vapor phase, said amines being preferably thus removed substantially at the rate at which they are formed in the reactor. It has been further discovered that the continuous removal of the amines, e. g. aromatic amines, from the sphere of reaction, which removal, in accordance with the process of the present invention, is effected by maintaining such operating conditions, i. e. reaction temperatures and pressures, as well as the feed ratios of the various reactants and/or other substances introduced into the reactor, that the formed amines are vaporized and removed as the overhead fraction, greatly enhances the activity and life of the catalyst, increases the rate of reaction, and avoids the necessity of using costly and cumbersome apparatus normally employed for the separation of the catalyst from liquid reaction products. Another feature of the present invention involves the injection of an inert liquid, such as water or certain paraffinic hydrocarbons, into the reaction zone, the heat required for the vaporization of said inert liquid being provided by the heat of reaction. In this manner, it is possible to control the hydrogenation reaction temperature within the desired limits, thereby avoiding or at least materially decreasing the conversion of the organic nitro compounds to undesirable byproducts. When the hydrogenation reaction is effected under the conditions described herein, the water concentration in the liquid phase in the reactor is extremely low, if not negligible, even when water (as distinguished from steam) is introduced into the reaction zone for purposes of dissipating the heat of reaction. This is due to the fact that the added water, as well as all of the water formed as a result of the hydrogenation reaction, is removed in the form of steam, so that there is no or substantially no separate aqueous phase in the reaction zone.

In accordance with a specific embodiment, the present invention comprises a continuous process for the production and separation of aromatic amines, this process including the steps of introducing a preferably finely divided hydrogenation catalyst into a reactor, continuously or intermittently introducing an aromatic nitro compound into said reaction zone, continuously conveying hydrogen or a hydrogen-containing gas thereinto, and correlating the rates of feed of said reactants and the inlet and reaction temperatures and pressures to maintain the nitro compound in the liquid state while most if not all of the amino compound formed as a result of the hydrogenation reaction is withdrawn in the vapor state substantially at the rate at which it is formed. In a preferred embodiment, liquid water is continuously fed into the reaction zone, the vaporization of this water taking up the heat of reaction, thereby facilitating the maintenance of the desired or optimum reaction temperature in spite of the fact that the hydrogenation reaction is highly exothermic in character. The rates of introduction of the hydrogen and of the substances which are vaporized under the operating conditions maintained in the reaction zone should preferably be such as to maintain the catalyst in suspension in the aromatic nitro compound.

The process of the present invention is applicable to the selective hydrogenation of the nitro group or groups of various nitrated organic compounds, especially of aromatic nitro compounds, i. e. compounds in which one or more —$NO_2$ groups are attached directly to an aryl nucleus. The following is an exemplary list of a few of these compounds: nitro benzene, dinitro benzene, nitro toluene, dinitro toluene, nitro phenol, nitro aniline, nitro naphthalene, nitro benzaldehyde, and the like, and their homologues and analogues. A particularly suitable group of compounds which may be hydrogenated in accordance with the process of the present invention comprises the mononitrated mononuclear aromatic hydrocarbons having the general formula

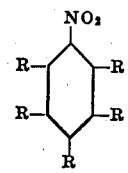

wherein each R represents the hydrogen atom or a like or different alkyl radical such as methyl, ethyl, n-propyl, isopropyl, ni-butyl, etc., or the long chain alkyl groups, such as dodecyl, etc., the invention being especially applicable to the hydrogenation of mononitrated compounds having the above general formula in which at least one of the radicals R attached to the nucleus is a saturated aliphatic radical having up to about four carbon atoms in the chain, these mononitrated compounds being converted to the corresponding aromatic primary amines, e. g. toluidines, xylidines, and their homologues.

Any of the more active hydrogenation catalysts may be used to promote the hydrogenation reaction. A suitable catalyst comprises or consists of a base metal hydrogenation catalyst, e. g. nickel, cobalt or copper, whether employed alone or supported on a finely divided carrier such as kieselguhr, asbestos, pumice, or another inert material. One of the catalysts found to be particularly effective comprises a nickel catalyst prepared by the treatment of a nickel alloy, such as nickel-aluminum, or nickel-silicon, with aqueous alkalies, as described in the U. S. Patent No. 1,628,190. Another suitable nickel catalyst is a supported catalyst which may be formed by mixing an aqueous solution of a nickel salt and a foraminous carrier, e. g. acid-washed kieselguhr, grinding the carrier-nickel-salt mixture to a desired consistency, adding a carbonate precipitant which reacts basic to litmus paper, preferably an aqueous solution of an ammonium or an alkali metal carbonate, such as ammonium carbonate, sodium carbonate or sodium bicarbonate, maintaining a temperature of from 70° C. to 80° C. during such addition, washing and drying the resulting supported precipitated nickel carbonate, and reducing it in a stream of hydrogen or other reducing gas for a suitable period of time and at a reducing temperature in the range of about 425° C. to 475° C. Still another suitable catalyst may be formed as follows: A basic carbonate of nickle is dissolved in ammonium hydroxide solution or an ammonium salt solution capable of forming a soluble ammonia complex of the nickel carbonate; this solution is then intimately mixed with an inert finely divided support of the above-defined class, thereby saturating the surface of said inert material and forming a thick paste; the paste thus formed is dried rapidly with agitation, screened, and thereafter reduced by heating in a stream of hydrogen. Instead of employing finely divided catalysts which are maintained in suspension, it is also possible to effect the reaction with supported stationary-bed catalysts.

Nickel catalysts, whether of the supported or unsupported type, and prepared by other methods, such as the following, may also be used in the practice of the invention: (1) the reduction of nickel oxides or silicates, either supported or unsupported, by hydrogen or other reducing gases or agents; (2) the reduction of nickel oxides, silicates, carbonates and/or bicarbonates in admixture with salts of other metals of Group VIII of Mendeleeff's Periodic Table, the reduced salts acting as co-catalysts; (3) the reduction of nickel oxides, silicates, carbonates and bicarbonates with promoters such as oxides of the metals of Groups II, III, IV, V and VI of Mendeleeff's Periodic Table; (4) anodic oxidation of nickel surfaces followed by reduction; (5) precipitation by more electro-positive metals such as aluminum and zinc. Other base metal hydrogenation catalysts prepared by any one of the above methods may also be used, examples being those formed from copper and/or cobalt. Platinum and other noble metal catalysts may also be employed with satisfactory results but, because of the lower cost of the base metal hydrogenation catalysts, the latter will generally be used. Of these, the aforementioned supported and unsupported nickel catalysts are preferred because of their high activity. In order to maintain the catalyst in suspension in the liquid phase, it is advisable to have the prepared catalyst in a finely divided state, e. g. of about 200-mesh fineness.

The temperature and pressure in the hydrogenation zone may vary within relatively wide limits, and should be correlated with each other and with the other variables and other operating conditions, e. g. the specific nitro compound treated, the ratio thereof to the hydrogen, etc., so as to maintain the nitro compound in the liquid state in the reaction zone, while the amino compound formed as a result of the hydrogenation is removed from said zone in the vapor state together with the excess hydrogen, steam, etc., conveyed therethrough. Generally speaking, the temperature during hydrogenation may be in the range of from room temperature up to, but not including, temperatures at which the nitro compound boils under conditions of operation. A temperature in the neighborhood of from 150° C. to 200° C. is considered advantageous in the hydrogenation of nitro xylenes to produce xylidines because at these temperatures the amount of impurities formed by side reactions is small, the water formed in the reaction, as well as any added for temperature control purposes, is readily vaporized and removable in the vapor state, and the xylidines are also vaporized substantially as soon as formed, while the nitro xylenes remain in the liquid state and in intimate contact with the catalyst in the hydrogenation zone. The optimum temperatures will depend on the particular nitro compound treated, and on the pressure maintained in the reactor.

The total pressure during hydrogenation may vary from atmospheric to as high as 150 or 200 atmospheres, and even still higher. An increase in the partial pressure of the hydrogen, other conditions being maintained equal, increases the rate of hydrogenation. In the case of the hydrogenation of nitro xylenes the preferred range is between about 75 and about 250 pounds per square inch gage, although pressures of up to about 1000 pounds per square inch have been found to be very satisfactory also.

It was noted that a convenient method of effecting the catalytic hydrogenation of the above defined nitro compounds comprises the introduction of the nitro compounds in the liquid state into a reaction zone into which a finely divided hydrogenation catalyst is placed, passage of hydrogen or a hydrogen-containing gas through the reaction zone, and the correlation of the rates of feed of these reactants and of the temperatures and pressures in the zone to maintain the nitro compound in the liquid state, while most if not all of the amino compound is withdrawn in the vapor state, preferably at the rate at which it is formed. Although the selective hydrogenation reaction of the nitro compounds to the corresponding amino compounds may be effected with any hydrogen-to-nitro compound ratio, in order to attain the desired substantially quantitative conversion to the corresponding amines, and also for the purpose of maintaining the catalyst in suspension in the liquid phase, it is generally desirable to employ the hydrogen in an amount in excess of that necessary for the desired hydrogenation. The use of such excess hydrogen also permits the maintenance of the desired superatmospheric pressure in the reaction zone. A material decrease in the hydrogen concentration, i. e. in the ratio of hydrogen to the nitro compounds introduced into the reactor, in the case where continuous or intermittent operations are employed, will generally result in a decrease in the conversion of the nitro compound treated.

In the case of the conversion of nitro xylenes to xylidines in accordance with the above defined process, in which temperatures of from about 150° C. to about 200° C. are maintained, and where the reaction is effected under a reactor pressure of between about 100 pounds per square inch and about 150 pounds per square inch gage, highly satisfactory conversions to and yields of xylidines have been obtained with hydrogen-to-nitro xylene mol ratios of between about 25:1 and about 75:1, although higher and lower mol ratios, e. g. as low as 10:1, may also be suitable and even preferred under slightly modified operating conditions.

In practicing the process of the present invention, it is advantageous or at least economical to recirculate to the reaction zone the excess hydrogen which has been withdrawn therefrom, said recirculation being preferably effected after the separation of at least a substantial part of the liquefiable substances, i. e. water and amines. The circulating gas is therefore cooled to condense said vapors carried out of the reaction zone, and the remaining gas is then recirculated with the addition of make-up hydrogen into the reaction zone. Instead of employing pure hydrogen, the recirculating gas may be constituted of a mixture of hydrogen and of an inert gas, e. g. nitrogen. As mentioned, the circulation of a considerable quantity of gas is advantageous in that the circulating gas also acts as a carrier for the removal of water vapor and of the aromatic amines. Additionally, the circulating gas keeps the particles of catalyst carrier in suspension and also aids in maintaining the reaction zone at the desired superatmospheric pressure.

Because the hydrogenation reaction is exothermic, the maximum temperature within the reactor will be materially higher than the temperature of the substances introduced thereinto. Since excessively high temperatures tend to cause the production of undesirable byproducts and also may vaporize the unreacted nitro compound, it is necessary to employ inert gases, vapors or liquids which will facilitate temperature control, thereby preventing the aforementioned undesirable secondary reaction. Gaseous and vaporous substances, such as steam and nitrogen, may be employed for this purpose. However, it was found that excellent results may be attained by introducing water in the liquid state, the vaporization of said water facilitating the aforementioned temperature control. The amount of water thus added may vary within a relatively wide range, although it is preferable to employ a molal excess thereof over the amount of the nitro compound fed into the reactor; the mol ratio of water to the nitro compound may, for example, vary from 1:1 to 12:1, or higher. Other inert liquids, such as paraffinic hydrocarbons which will vaporize under the operating conditions, may also be used, the latent heat of vaporization of these inert liquids being employed to dissipate the heat of reaction, thereby controlling the temperature in the hydrogenation zone.

The advantages attained by the use of the process of the present invention are as follows: (a) high rate of reaction; (b) continuous removal of the aromatic amines substantially as soon as they are formed, thereby avoiding or decreasing the tendency to the formation of byproducts and favoring a relatively low nitro compound concentration in the reaction zone (c) low water concentration in the liquid phase in the reactor; (d) the use of temperatures above those normally employed for liquid phase hydrogenations; (e) high conversions to the desired amines per unit of catalyst employed; and (f) the avoidance of interruptions necessary for the withdrawal of the amines through filtration and the like when hydrogenation reactions of this class are effected in the liquid state in accordance with the previously known processes.

The following example, which is intended to be illustrative only, describes the advantages and benefits derived from effecting the hydrogenation of aromatic nitro compounds in accordance with the present process.

*Example*

The reactor employed consisted of a vertically disposed column, 8 feet high and 4 inches in diameter. A filter was disposed in the lower portion of the reactor for the purpose of removing periodically any liquid substances present therein. Nitro xylenes were injected into the reactor at an intermediate point thereof after being preheated to various temperatures, as described hereinbelow. Similarly, water in the liquid state was also continuously fed into the reactor at an intermediate point which, however, was below the point of introduction of the nitro xylenes. Hydrogen was injected into the lower portion of the reactor. The vapors were removed from the upper end of the reactor and were cooled to remove therefrom the liquefiable fraction, namely xylidines and water, the remaining uncondensed gases consisting of substantially pure hydrogen being recycled together with make-up hydrogen. Approximately half a pound of finely divided nickel catalyst was disposed in the reactor, and the reactants, namely nitro xylenes and the hydrogen, as well as the water, were then introduced continuously into this reactor at varying feed rates and at varying inlet temperatures, while the reaction temperature was maintained at between about 150° C. and about 200° C. At certain intervals of time the products condensed from the overhead fraction, as well as those filtered through the filter disposed in the reactor, were analyzed. The run was conducted for a period of 302.5 hours, during which the operating conditions and the results obtained were as follows:

| | | |
|---|---|---|
| Reactor temperature | °C | 150–200 |
| Exit gas temperature | °C | 120–160 |
| Nitro xylene feed temperature | °C | 20–120 |
| Hydrogen feed temperature | °C | 20–145 |
| Reactor pressure | p. s. i. | 100–150 |
| Nitro xylene feed rate | gallons per hour | 0.43 |
| Average water feed rate | do | 0.35 |
| Average hydrogen feed rate | standard cu. ft. per min. | 5.0 |
| Average water-to-nitro xylene mol ratio | | 5.9 |
| Average hydrogen-to-nitro xylene mol ratio | | 31 |
| Contact time | hours | 3.8 |

For the last 88 hours of operation of this run the reaction temperature was maintained at between about 190° C. and about 200° C., the exit gas temperature being equal to about 135° C. to 160° C. The nitro xylene was fed at a temperature of between about 22° C. and 27° C., the hydrogen being preheated to a temperature varying from about 115° C. to 145° C. The reaction pressure was about 100 pounds per square inch gage. With a hydrogen-to-nitro xylene mol ratio of about 28 and a water-to-nitro xylene mol ratio of between about 6.5 and 7.4, between about 98 and about 100 weight percent of the xylidines formed were removed together with the steam and hydrogen in the overhead fraction. The organic phase analyzed approximately 96.5 weight percent of xylidines. The total yield of xylidines for the whole run was equal to about 1780 pounds per pound of nickel catalyst used.

In like manner, by modifying somewhat the operating conditions, e. g. temperature and pressure, other nitro compounds may be hydrogenated to the corresponding amino compounds. For example, nitro benzene may be converted to aniline, o-nitro toluene to o-toluidine, alpha-nitro naphthalene to alpha naphthylamine, etc.

I claim as my invention:

1. A process for the continuous production and recovery of xylidines by the liquid phase catalytic hydrogenation of nitro xylenes which comprises disposing a finely divided nickel catalyst in a reaction zone, continuously introducing nitro xylenes in the liquid state into said zone, maintaining the liquid phase in said zone at a temperature of between about 190° C. and about 200° C., continuously introducing water into said reaction zone in an amount equal to between about 6.5 and about 12 moles of water per mole of the nitro xylene feed, continuously passing hydrogen through the liquid phase at a rate sufficient to maintain in the reaction zone a pressure of about 100 pounds per square inch gage, said rate of hydrogen introduction being sufficient to cause hydrogenation of the nitro xylenes, to maintain the catalyst in suspension in the liquid phase, and to remove in vapor form from the reaction zone substantially all of the formed xylidines and substantially all of the water introduced and produced during the hydrogenation reaction, withdrawing said vapor phase from the sphere of reaction, separately recovering the xylidines and water therefrom and recycling excess hydrogen, together with added hydrogen, through said reaction zone.

2. A process for the continuous production and recovery of xylidines by the liquid phase catalytic hydrogenation of nitro xylenes which comprises disposing a finely divided nickel-containing catalyst in a reaction zone, continuously introducing nitro xylenes in the liquid state into said zone, maintaining the liquid phase in said reaction zone at a temperature of between about 150° C. and about 200° C., continuously introducing water into said reaction zone in a mol excess over the rate of introduction of the nitro xylenes, continuously passing hydrogen through the liquid phase in said reaction zone at a rate sufficient to maintain the reaction zone under a superatmospheric pressure, to cause hydrogenation of the nitro xylenes in the liquid phase, to maintain the catalyst in suspension in the liquid phase, and to remove in vapor form from the reaction zone substantially all of the xylidines substantially as rapidly as formed therein together with substantially all of the water introduced and produced during the hydrogenation reaction, withdrawing said vapor phase from the sphere of reaction, separately recovering the xylidines and water therefrom and recycling excess hydrogen through the reaction zone.

3. A process for continuous production and recovery of xylidines by the liquid phase catalytic hydrogenation of nitro xylenes which comprises disposing in a reaction zone a finely divided catalyst comprising a metal effective to catalyze hydrogenation reactions, continuously introducing nitro xylenes in the liquid state into said reaction zone, maintaining the liquid phase in said reaction zone at a temperature of between about 150° C. and about 200° C., continuously introducing water into said zone in a mol excess over the amount of nitro xylenes thus introduced, continuously passing hydrogen through the liquid in the reaction zone, maintaining a hydrogen to nitro xylene mol ratio of between about 25:1 and about 75:1, maintaining a superatmospheric pressure in said reaction zone, and correlating the temperature, pressure and rate of input of said nitro xylenes, water and hydrogen to maintain substantially all of said nitro xylenes in the liquid phase, maintain the catalyst in suspension, and remove in vapor form from said reaction zone substantially all of the xylidines substantially at the rate of their formation therein together with substantially all of the water introduced and produced during the hydrogenation reaction.

4. A process for the continuous production and recovery of xylidines by the liquid phase catalytic hydrogenation of nitro xylenes which comprises disposing in a reaction zone a finely divided catalyst comprising a metal effective to catalyze hydrogenation reactions, continuously introducing nitro xylenes in the liquid state into said reaction zone, maintaining the liquid phase in said reaction zone at a temperature of between about 150° C. and about 200° C., continuously introducing water into said zone in a mol excess over the amount of nitro xylenes thus introduced, continuously passing hydrogen through the liquid in the reaction zone, maintaining a hydrogen to nitro xylene mol ratio of between about 10:1 and about 75:1, maintaining a superatmospheric pressure in said reaction zone, and correlating the temperature, pressure and rate of input of said nitro xylenes, water and hydrogen to maintain substantially all of said nitro xylenes in the liquid phase, maintain the catalyst in suspension, and remove in vapor form from said reaction zone substantially all of the xylidines substantially at the rate of their formation therein together with substantially all of the water introduced and produced during the hydrogenation reaction.

5. In a process for the production of xylidines by the liquid phase catalytic hydrogenation of nitro xylenes, the steps of continuously introducing nitro xylenes and water in the liquid state and hydrogen into a reaction zone wherein a finely divided nickel catalyst is disposed, maintaining the temperature and pressure in said zone sufficient to effect the hydrogenation of the nitro xylenes in the liquid phase to the corresponding xylidines, and correlating the temperature and pressure and rates of input of the nitro xylenes, water and hydrogen to maintain substantially all of said nitro xylenes in the liquid phase, maintain the catalyst in suspension in the nitro xylenes, and to remove as vapor from the hydrogenation reaction zone substantially all of the produced xylidines substantially at the rate of their formation, as well as substantially all of the water introduced and produced in said hydrogenation reaction zone.

6. In a process for the production of xylidines by the liquid phase catalytic hydrogenation of nitro xylenes, the steps of continuously introducing nitro xylenes and water in the liquid state and hydrogen into a reaction zone wherein a finely divided nickel-containing catalyst is disposed, effecting the hydrogenation of the nitro xylenes to the corresponding xylidines, and correlating the temperature, pressure and rates of input of the introduced substances to maintain substantially all of said nitro xylenes in the liquid state, maintain the catalyst in suspension in the nitro xylenes, and to remove as vapor from the hydrogenation reaction zone substantially all of the produced xylidines substantially at the rate of their formation, as well as the water introduced and produced in the hydrogenation reaction zone.

7. In a process for the production of xylidines by the liquid phase catalytic hydrogenation of nitro xylenes, the steps of continuously introducing nitro xylenes and water in the liquid state and hydrogen into a reaction zone wherein a finely divided nickel-containing catalyst is disposed, maintaining said catalyst in suspension in the nitro xylenes, and correlating the temperature, pressure and rates of input of the introduced substances to maintain substantially all of said nitro xylenes in the liquid state and to remove as vapor from the hydrogenation zone substantially all of the xylidines as well as the water introduced and produced in the hydrogenation zone.

8. In a process for the production of xylidines by the liquid phase catalytic hydrogenation of nitro xylenes, the steps of continuously introducing nitro xylenes in the liquid state and hydrogen in the vapor state into a reaction zone wherein a finely divided nickel-containing catalyst is disposed, maintaining said catalyst in suspension in said nitro xylenes, maintaining in said reaction zone a temperature and pressure sufficient to effect the hydrogenation of the nitro xylenes in the liquid state to the corresponding xylidines, and correlating the temperature, pressure and rates of introduction of nitro xylenes and hydrogen into said reaction zone to remove as vapor from the hydrogenation zone substantially all of the produced xylidines substantially as rapidly as formed therein while maintaining substantially all of the nitro xylenes in the liquid phase.

9. In a process for the production of xylidines by the catalytic liquid phase hydrogenation of nitro xylenes, the steps of subjecting nitro xylenes in the liquid phase to the action of hydrogen in the presence of a finely divided nickel-containing catalyst suspended in said nitro xylenes at nitro xylene hydrogenating conditions, and correlating the temperature, pressure and rate of introduction of hydrogen and nitro xylenes into said reaction zone to effect the removal therefrom of xylidines in the vapor phase substantially as rapidly as formed while maintaining substantially all of said nitro xylenes in the liquid phase.

10. In a process for the production of toluidine by the catalytic liquid phase hydrogenation of nitrotoluene, the steps of subjecting nitrotoluene in the liquid phase to the action of hydrogen in the presence of a finely divided nickel-containing catalyst suspended in said nitrotoluene at nitrotoluene hydrogenating conditions, and correlating the temperature, pressure and rate of introduction of hydrogen and nitrotoluene into said reaction zone to effect the removal therefrom of toluidine in the vapor phase substantially as rapidly as formed while maintaining substantially all of said nitrotoluene in the liquid phase.

11. In a process for the production of a mononuclear primary aromatic amine having from none to five lower alkyl substituent groups directly attached to the aromatic nucleus and being otherwise unsubstituted, by the catalytic liquid phase hydrogenation of the corresponding mononuclear aromatic nitro compound, the steps of subjecting said aromatic nitro compound in the liquid phase to the action of hydrogen in the presence of a finely divided nickel-containing catalyst suspended in said aromatic nitro compound at hydrogenating conditions of temperature and pressure effecting the hydrogenation of said aromatic nitro compound to the corresponding aromatic primary amine, and correlating the temperature, pressure and rate of introduction of hydrogen and said aromatic nitro compound into said reaction zone to effect the removal therefrom of said primary aromatic amine in the vapor phase substantially as rapidly as formed while maintaining substantially all of said aromatic nitro compound in the liquid phase.

12. In a process for the production of a mononuclear primary aromatic amine having from none to five lower alkyl substituent groups directly attached to the aromatic nucleus and being otherwise unsubstituted, by the catalytic liquid phase hydrogenation of the corresponding mononuclear aromatic nitro compound, the steps of continuously introducing said aromatic nitro compound and water in the liquid state and hydrogen into a reaction zone wherein a finely divided nickel catalyst is disposed, maintaining the temperature and pressure in said zone sufficient to effect the hydrogenation of the aromatic nitro compound in the liquid phase to the said primary aromatic amine, and correlating the temperature and pressure and rates of input of said aromatic nitro compounds, water, and hydrogen to maintain substantially all of said aromatic nitro compound in the liquid phase, maintain the catalyst in suspension in the aromatic nitro compound, and to remove as vapor from the hydrogenation reaction zone substantially all of the produced primary aromatic amine substantially at the rate of formation thereof, as well as substantially all of the water introduced and produced in said hydrogenation reaction zone.

13. In a process for the production of a mononuclear primary aromatic amine having from none to five lower alkyl substituent groups directly attached to the aromatic nucleus and being otherwise unsubstituted, by the catalytic liquid phase hydrogenation of the corresponding mononuclear aromatic nitro compound, the steps of continuously introducing said aromatic nitro compound in the liquid state and hydrogen in the vapor state into a reaction zone wherein a finely divided nickel-containing catalyst is disposed, maintaining said catalyst in suspension in said nitro compound, maintaining in said reaction zone a temperature and pressure sufficient to effect the hydrogenation of the nitro compound in the liquid state to the corresponding primary aromatic amine, and correlating the temperature, pressure and rates of introduction of said nitro compound and hydrogen into said reaction zone to remove as vapor from the hydrogenation zone substantially all of the produced primary aromatic amine substantially as rapidly as formed therein while maintaining substantially all of the nitro compound in the liquid phase.

14. A process for the continuous production and recovery of aniline by the liquid phase catalytic hydrogenation of nitrobenzene, which comprises disposing in a reaction zone a finely divided catalyst comprising a metal effective to catalyze hydrogenation reactions, continuously introducing nitrobenzene in the liquid state into said reaction zone, maintaining the liquid phase in said reaction zone at a temperature of between about 150° C. and about 200° C., continuously introducing water into said zone in a mol excess over the amount of nitrobenzene thus introduced, continuously passing hydrogen through the liquid in the reaction zone, maintaining a hydrogen to nitrobenzene mol ratio of between about 10:1 and about 75:1, maintaining a superatmospheric pressure in said reaction zone, and correlating the temperature, pressure, and rate of input of said nitrobenzene, water and hydrogen to maintain substantially all of said nitrobenzene in the liquid phase, maintain the catalyst in suspension, and remove in vapor form from said reaction zone substantially all of the aniline substantially at the rate of its formation therein together with substantially all of the water introduced and produced during the hydrogenation reaction.

15. In a process for the production of aniline by the liquid phase catalytic hydrogenation of nitrobenzene, the steps of subjecting nitrobenzene in the liquid phase to the action of hydrogen in the presence of a finely divided base metal effective to catalyze hydrogenation reactions suspended in said nitrobenzene at nitrobenzene hydrogenating conditions, and correlating the temperature, pressure and rate of introduction of hydrogen and nitrobenzene into said reaction zone to effect the removal therefrom of aniline in the vapor phase substantially as rapidly as formed while maintaining substantially all of said nitrobenzene in the liquid phase.

16. In a process for the production of aniline by the liquid phase catalytic hydrogenation of nitrobenzene, the steps of continuously introducing nitrobenzene and water in the liquid state and hydrogen into a reaction zone wherein a finely divided nickel catalyst is disposed, maintaining the temperature and pressure in said zone sufficient to effect the hydrogenation of the nitrobenzene in the liquid phase to aniline, and correlating the temperature and pressure and rates of input of the nitrobenzene, water, and hydrogen to maintain substantially all of said nitrobenzene in the liquid phase, maintain the catalyst in suspension in the nitrobenzene, and to remove as vapor from the hydrogenation reaction zone substantially all of the produced aniline substantially at the rate of its formation, as well as substantially all of the water introduced and produced in said hydrogenation reaction zone.

MOTT SOUDERS, Jr.

REFERENCES CITED

The following references are of record in the file of this patent:

UNITED STATES PATENTS

| Number | Name | Date |
|---|---|---|
| 949,954 | Bedford | Feb. 22, 1910 |
| 1,955,873 | Deanesly | Apr. 24, 1934 |
| 2,292,879 | Kise | Aug. 11, 1942 |

FOREIGN PATENTS

| Number | Country | Date |
|---|---|---|
| 281,100 | Germany | Dec. 12, 1914 |

OTHER REFERENCES

Groggins: "Aniline and its Derivatives," pp. 150–153.